United States Patent
Kagawa et al.

(10) Patent No.: US 8,072,647 B2
(45) Date of Patent: Dec. 6, 2011

(54) COLOR CONVERSION APPARATUS AND METHOD

(75) Inventors: Shuichi Kagawa, Tokyo (JP); Jun Someya, Tokyo (JP); Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 652 days.

(21) Appl. No.: 12/222,731

(22) Filed: Aug. 14, 2008

(65) Prior Publication Data

US 2009/0046332 A1 Feb. 19, 2009

(30) Foreign Application Priority Data

Aug. 17, 2007 (JP) ................... 2007-212779

(51) Int. Cl.
*G03F 3/08* (2006.01)
*G06F 15/00* (2006.01)
*H04N 1/46* (2006.01)
*G06K 9/00* (2006.01)

(52) U.S. Cl. ......... 358/1.9; 358/518; 358/535; 382/162; 382/167; 382/205

(58) Field of Classification Search .............. 358/1.9, 358/518, 535; 382/162, 167, 205
See application file for complete search history.

(56) References Cited

U.S. PATENT DOCUMENTS

| | | | |
|---|---|---|---|
| 7,177,469 B2 | 2/2007 | Kagawa et al. | |
| 7,660,015 B2 * | 2/2010 | Kagawa et al. | ............ 358/1.9 |
| 2007/0132680 A1 | 6/2007 | Kagawa et al. | |

FOREIGN PATENT DOCUMENTS

| | | |
|---|---|---|
| JP | 2004-201106 A | 7/2004 |
| JP | 2005-184117 A | 7/2005 |
| JP | 2005-192158 A | 7/2005 |
| JP | 2005-295490 A | 10/2005 |
| JP | 4069860 A | 1/2008 |

* cited by examiner

*Primary Examiner* — Charlotte M Baker
(74) *Attorney, Agent, or Firm* — Birch, Stewart, Kolasch & Birch, LLP.

(57) ABSTRACT

A color conversion apparatus receives first image data including first red-green-blue color data in which the possible values of the red, green, and blue components extend beyond the range from 0% to 100%. The first color data are analyzed into first hue region data, the magnitudes of which are adjusted according to the brightness and/or saturation of the first color data to obtain second and third hue region data. The gamut of colors of the first image data is detected, and matrix coefficients are generated according to the detected gamut. The matrix coefficients are used to perform a matrix operation on the second and third hue region data to obtain second color data, thereby converting the first image data to second image data with conversion characteristics appropriate for the gamut of colors of the first image data.

11 Claims, 10 Drawing Sheets

| HUE | HUE | DECISION CONDITION |
|---|---|---|
| RED | 0 | y > b AND m > g |
| YELLOW | 1 | r > c AND g > m |
| GREEN | 2 | y > b AND c > r |
| CYAN | 3 | g > m AND b > y |
| BLUE | 4 | c > r AND m > g |
| MAGENTA | 5 | r > c AND b > y |

COLOR CONVERSION APPARATUS AND METHOD

BACKGROUND OF THE INVENTION

1. Field of the Invention

The present invention relates to data processing used in image output equipment such as printers, video printers, and displays, more particularly to a color conversion apparatus and method for use in image output equipment in which image data having a wide gamut of colors are input and a corresponding image is output.

2. Description of the Related Art

An exemplary conventional color conversion apparatus and method are described in Japanese Patent Application Publication No. 2005-184117. The conventional color conversion apparatus includes means for calculating characteristic information about degrees of brightness and saturation of first color data, means for calculating first hue region data values valid in respective hue components by using the first color data, means for using the characteristic information to adjust magnitudes of the first hue region data values to obtain second hue region data values, means for using the difference between the first hue region data values and the second hue region data values to obtain third hue region data values, means for performing a matrix operation using the second and third hue region data values as terms to obtain correction amounts, and color correction means for using the correction amounts to obtain second color data.

This conventional color conversion method enables either the brightness or the saturation of a particular hue component to be modified according to the brightness or saturation of the first color data. If, for example, the image output equipment is a display with a certain gamut of reproducible colors, and the gamut of colors in the image signal formed by the first color data is known, optimal conversion coefficients can be derived from the relation between these two gamuts to obtain a well-displayed image. The gamut of colors of the image signal is defined in terms of a color space, such as the international standard sRGB color space specified in standard 61966-2-1 of the International Electrotechnical Commission (IEC). For broadcast image (video) signals, there is also the BT.709 standard, 'Parameter values for the HDTV standards for production and international programme exchange' established by the Radiotelecommunication sector of the International Telecommunication Union (ITU-R). Both the sRGB and BT.709 standards define gamuts based on the characteristics of ordinary cathode ray tube (CRT) displays, and have the same red, green, and blue hues.

Recently, however, various types of displays with wider gamuts of colors than the traditional CRT have been developed and marketed. Furthermore, the gamut defined by the sRGB standard is not necessarily adequate for representing the color distributions of actual objects. For these reasons, color spaces with wider gamuts have been internationally standardized. One example is the xvYCC standard (IEC 61966-2-4), which allows red, green, and blue values greater than 100% or less than 0% (negative values). This standard expands the gamut of the BT.709 standard without changing the red, green, and blue hue values located within the BT.709 gamut.

In the conventional method described above, if images with different gamuts of colors are input as the first image data, to display the images well, the conversion characteristics must be set on the basis of information about the gamut of the first color data. Although such information could conceivably be received with the first color data, in most cases the gamut of the first color data is unknown, making it impossible to produce well-displayed images from all types of first color data.

If scenes are considered individually instead of collectively their gamuts vary greatly, and the very wide xvYCC gamut is unlikely to be fully exploited in most scenes. Since the gamut of colors offered by typical display devices is not wide enough to include the entire xvYCC gamut, images that lie within the gamut of the display tend to be intermixed with images that exceed the gamut of the display, and images that slightly exceed the gamut of the display may be intermixed with images that greatly exceed the gamut of the display. The color conversion characteristics that produce the best displayed image vary for all of these cases.

SUMMARY OF THE INVENTION

An object of the present invention is to provide a color conversion apparatus and method that perform color conversion with appropriate characteristics for various gamuts of color data, even when the gamut of the color data is not known in advance.

The invention provides color conversion apparatus for converting first image data to second image data. The first image data include first color data with three values (red, green, blue) per picture element (pixel). The three values have ranges extending beyond the range from 0% to 100% in each of the red, green, and blue color components. The second image data include second color data with three values (red, green, blue) per pixel. The color conversion apparatus comprises:

a characteristic information calculator for calculating characteristic information of the first color data, the characteristic information including brightness or saturation;

a characteristic information calculator for calculating, from the first color data, a plurality of first hue region data values valid in respective hue regions surrounding certain predetermined hues;

a first hue region data generator for using the characteristic information to adjust magnitudes of the plurality of the first hue region data values to obtain second hue region data values and third hue region data values;

a gamut information detector for detecting a gamut of colors of the first image data and outputting gamut information representing the detected gamut of colors;

a coefficient generator for generating matrix coefficients for the second and third hue region data values with reference to the gamut information; and a matrix operation calculator for deriving the second color data by performing a matrix operation including multiplication of the second and third hue region data values by the matrix coefficients.

By detecting the gamut of colors of the first image data and adjusting the matrix coefficients accordingly, the color conversion apparatus can carry out color conversion with appropriate conversion characteristics for input image data having various gamuts of colors, even if the gamut of the input color data is not known in advance.

DETAILED DESCRIPTION OF THE INVENTION

Figure 1:
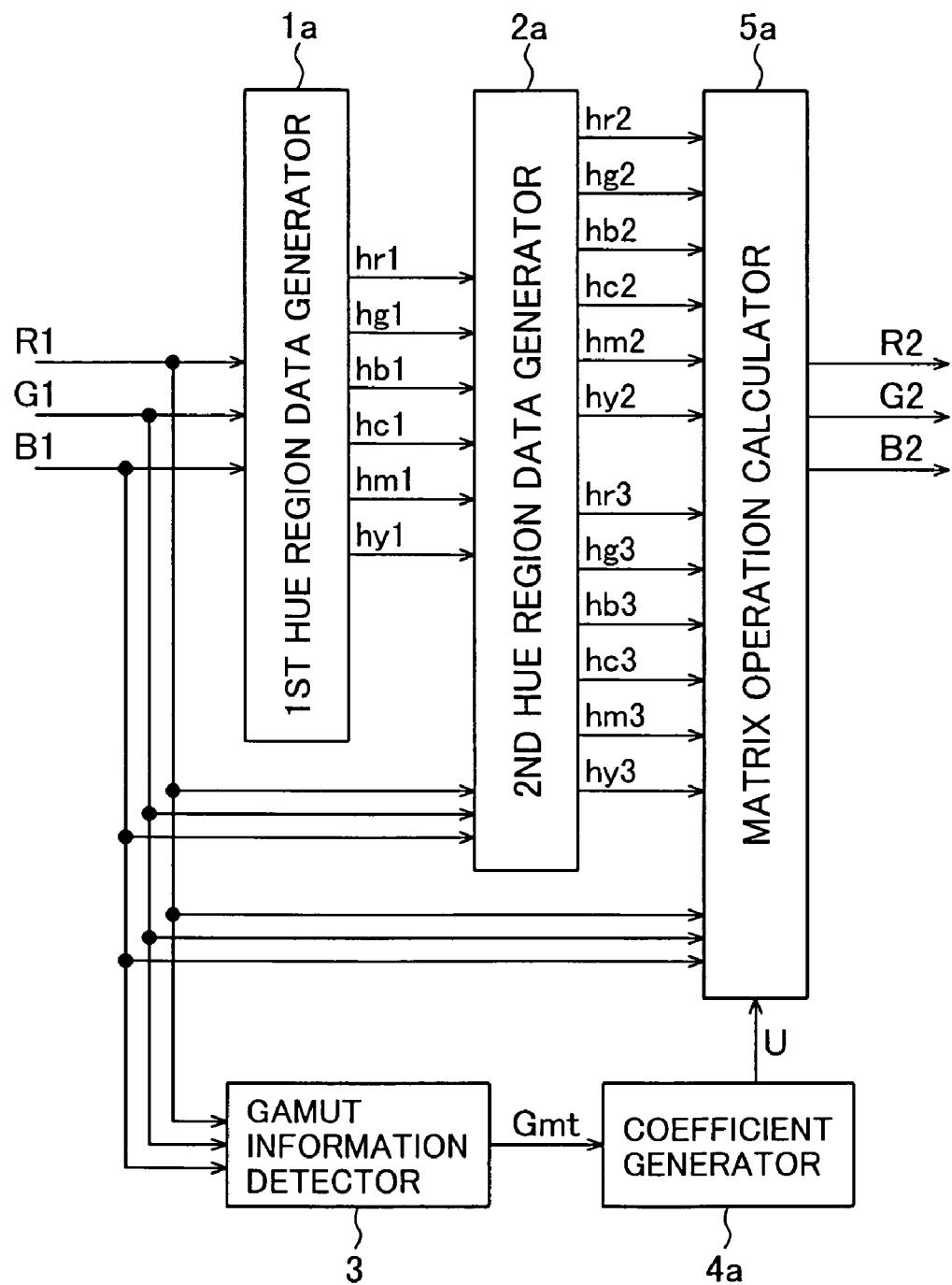
FIG. 1 is a block diagram illustrating a color conversion apparatus according to a first embodiment of the invention.

Embodiments of the invention will now be described with reference to the attached drawings, in which like elements are indicated by like reference characters.

First Embodiment

Referring to FIG. 1, the color data conversion apparatus in the first embodiment comprises a first hue region data generator 1a, a second hue region data generator 2a, a gamut information detector 3, a coefficient generator 4a, and a matrix operation calculator 5a.

In the drawing, R1, G1, and B1 indicate first color data for the three colors red, green, and blue. The data values may exceed 100% or fall below 0%. The first color data R1, G1, B1 are input to the first hue region data generator 1a, second hue region data generator 2a, and gamut information detector 3.

Figure 2:
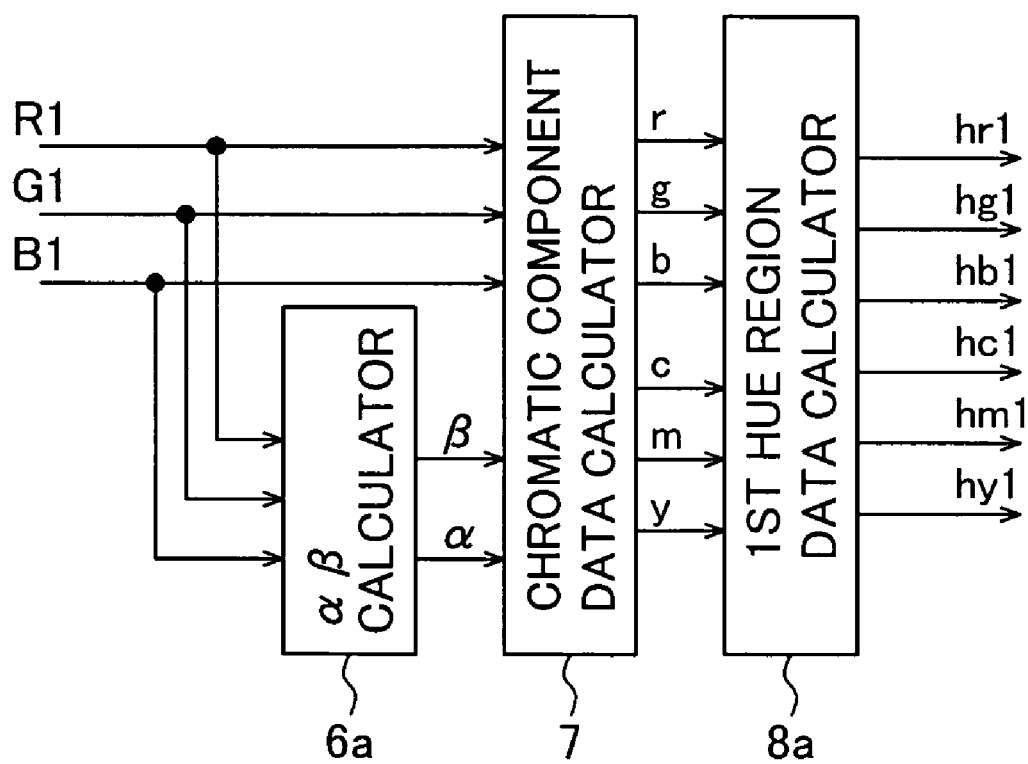
FIG. 2 is a block diagram showing an exemplary internal structure of the first hue region data calculator.

Referring to FIG. 2, in the first hue region data generator 1a, the first color data R1, G1, and B1 are input to an αβ calculator (maximum and minimum value calculator) 6a and a chromatic component data calculator 7. The αβ calculator 6a selects and outputs the maximum value β and minimum value α of the first color data R1, G1, B1. The output maximum value β and minimum value α are input to the chromatic component data calculator. The minimum value α expresses the size of the achromatic (gray) component in the first color data R1, G1, B1.

The chromatic component data calculator receives the first color data R1, G1, B1 and the maximum value β and minimum value α and calculates and outputs chromatic component data r, g, b, y, m, and c representing the magnitudes of the red, green, blue, yellow, magenta, and cyan color (chromatic) components left after the achromatic component has been removed from the colors represented by the first color data, on the basis of the first color data R1, G1, B1 and the maximum value β and minimum value α output from the maximum and minimum value calculator 1. These chromatic data are obtained by subtraction (r=R1−α, g=G1−α, b=B1−α, y=β−B1, m=β−G1, c=β−R1), and are related to the hue and saturation of the color data. A property of the chromatic component data obtained as above is that at least one of r, g, and b and at least one of y, m, and c assumes a value of zero.

If the maximum value β is R1 and the minimum value α is G1 (β=R1, α=G1), for example, from the above subtraction processes, g is zero and c is zero; if the maximum value β is R1 and the minimum value α is B1 (β=R1, α=B1), then b is zero and c is zero. Depending on the maximum-minimum combination of R1, G1, B1, that is, a total of at least two values, including at least one of r, g, and b and at least one of y, m, and c assume a value of zero. The chromatic component data obtained above are input to a first hue region data calculator 8a.

The first hue region data calculator 8a calculates first hue region data hr1, hg1, hb1, hc1, hm1, hy1 according to the equations (1) below. In these equations, min(A, B) takes the minimum value of A and B. The first hue region data hr1, hg1, hb1, hc1, hm1, hy1 are valid (non-zero) only for red, green, blue, cyan, magenta, and yellow, respectively.

$$hr1=\min(m,y)$$

$$hg1=\min(c,y)$$

$$hb1=\min(c,m)$$

$$hc1=\min(g,b)$$

$$hm1=\min(r,b)$$

$$hy1=\min(r,g) \quad (1)$$

The first hue region data hr1, hg1, hb1, hc1, hm1, hy1 are input to the second hue region data generator 2a.

Figure 3:
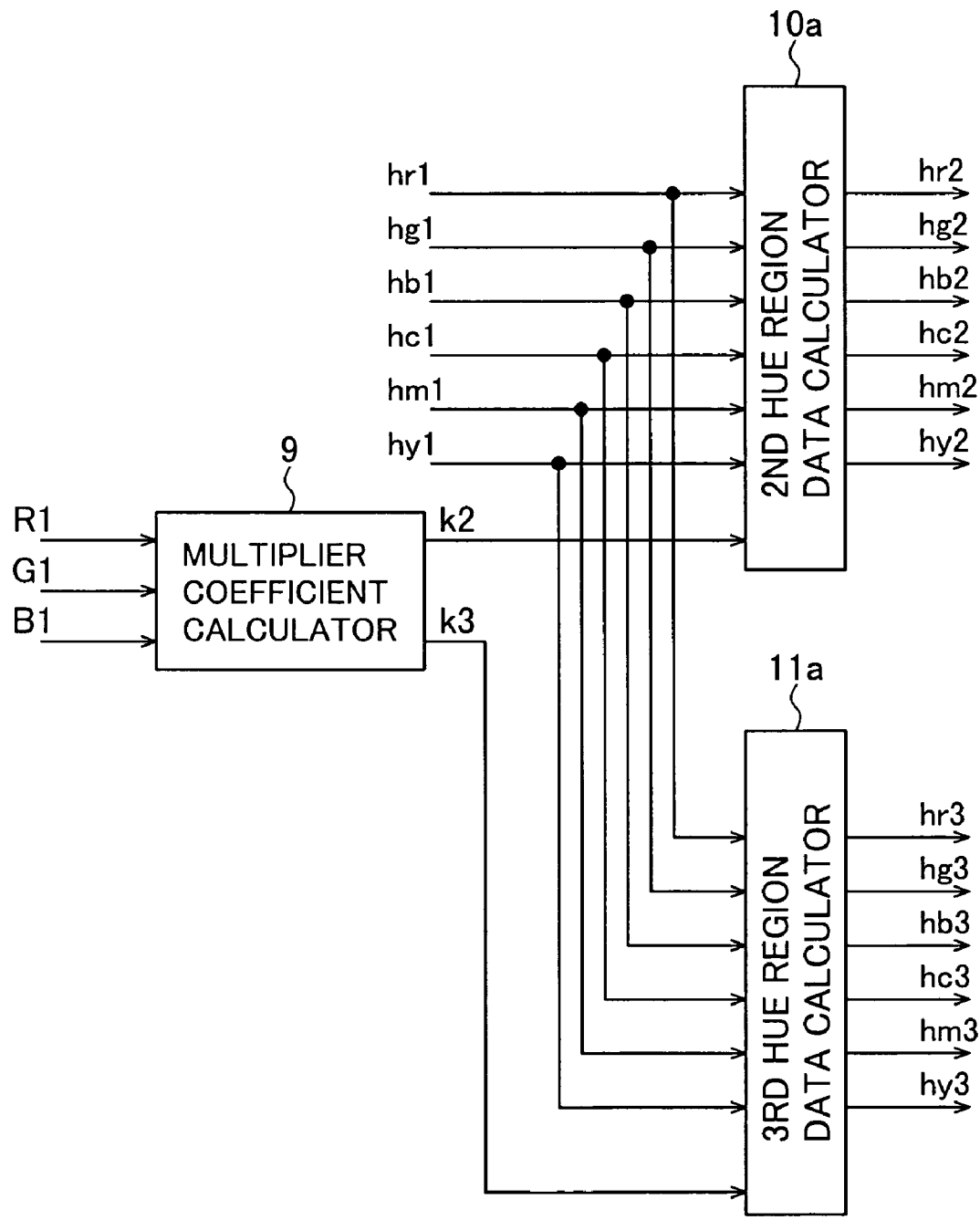
FIG. 3 is a block diagram showing an exemplary internal structure of the second hue region data calculator.

Referring to FIG. 3, the first color data R1, G1, B1 are input to a multiplier coefficient calculator 9. The multiplier coefficient calculator 9 refers to the input first color data R1, G1, B1 and calculates multiplier coefficients k2, k3 used to calculate second hue region data and third hue region data, respectively. An exemplary internal structure of the multiplier coefficient calculator 9 will be described in detail later.

A second hue region data calculator 10a adjusts the magnitudes of the first hue region data according to the equations (2) below and calculates second hue region data hr2, hg2, hb2, hc2, hm2, hy2.

$$hr2=k2\times hr1$$

$$hg2=k2\times hg1$$

$$hb2=k2\times hb1$$

$$hc2=k2\times hc1$$

$$hm2=k2\times hm1$$

$$hy2=k2\times hy1 \quad (2)$$

A third hue region data calculator 11a adjusts the magnitudes of the first hue region data according to the equations (3) below and calculates third hue region data hr3, hg3, hb3, hc3, hm3, hy3.

$$hr3=k3\times hr1$$

$$hg3=k3\times hg1$$

$$hb3=k3\times hb1$$

$$hc3=k3\times hc1$$

$$hm3=k3\times hm1$$

$$hy3=k3\times hy1 \quad (3)$$

The second hue region data hr2, hg2, hb2, hc2, hm2, hy2 and the third hue region data hr3, hg3, hb3, hc3, hm3, hy3 are input to the matrix operation calculator 5a.

Figure 4:
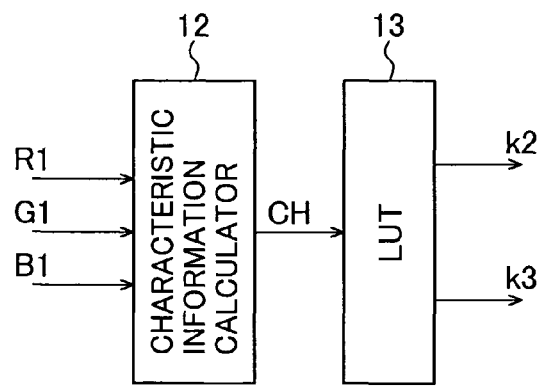
FIG. 4 is a block diagram showing an exemplary internal structure of the multiplier coefficient calculator.

Referring to FIG. 4, the multiplier coefficient calculator 9 includes a characteristic information calculator 12 and a lookup table (LUT) 13. The characteristic information calculator 12 receives the first color data R1, G1, B1, calculates characteristic information CH pertaining thereto, and outputs the characteristic information CH to the lookup table 13. The characteristic information CH includes saturation information, brightness information, or both for the first color data R1, G1, B1.

The lookup table 13 is configured as, for example, a memory storing multiplier coefficients k2, k3 corresponding to each value of the characteristic information CH, which is used as an address. The lookup table 14 thus receives the characteristic information CH as a read address and outputs the corresponding multiplier coefficients. Accordingly, the values of multiplier coefficients k2, k3 may vary depending on the saturation or brightness of the first color data R1, G1, B1. The second hue region data values and third hue region data values are adjusted by these multiple coefficients, so their magnitude (influence, or effect) varies with the saturation or brightness of the first color data R1, G1, B1.

Appropriate setting of the values of multiplier coefficients k2, k3 according to the characteristic information CH enables second hue region data with low saturation and third hue region data with high saturation, for example, to have a particularly high effect (large values).

In combination, the lookup table (LUT) 13 in FIG. 4 and the second hue region data calculator 10a and third hue region data calculator 11a constitute a means for adjusting the magnitudes of a plurality of first hue region data values hr1, hg1, hb1, hc1, hm1, hy1 by using the characteristic information from the characteristic information calculator 12 to obtain second hue region data hr2, hg2, hb2, hc2, hm2, hy2 and third hue region data hr3, hg3, hb3, hc3, hm3, hy3.

The gamut information detector 3 receives the first color data R1, G1, B1, estimates or detects the color gamut of the image data formed by the first color data, and outputs gamut information data Gmt.

Figure 5:
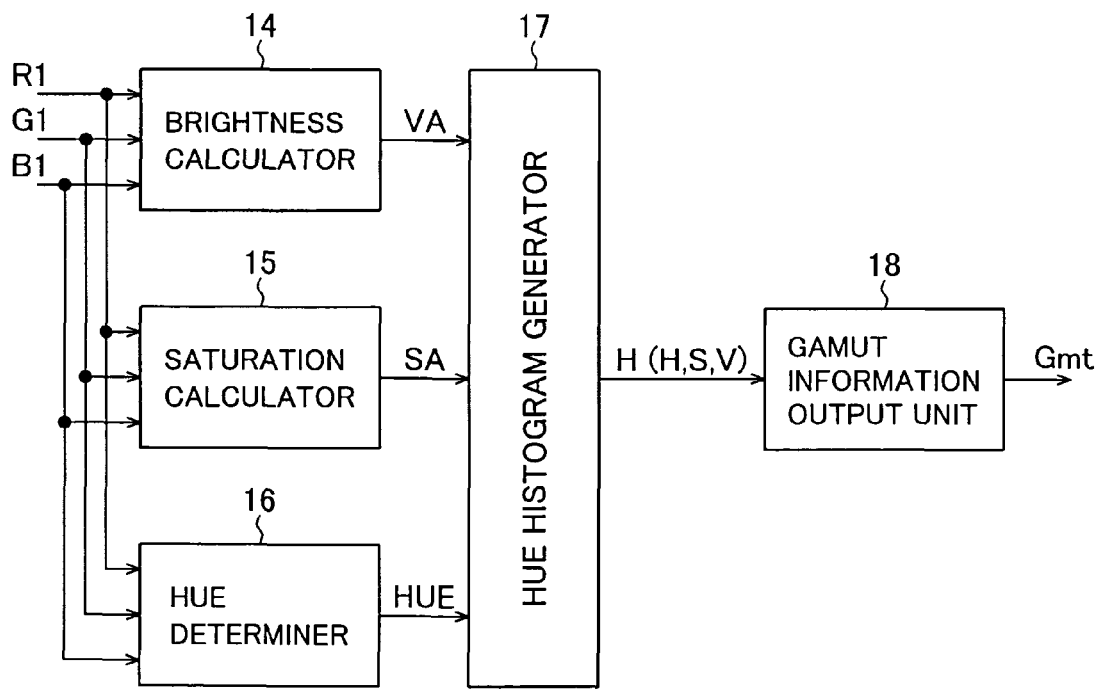
FIG. 5 is a block diagram showing an exemplary internal structure of the gamut information detector.

Referring to FIG. 5, the gamut information detector 3 comprises a brightness calculator 14, a saturation calculator 15, a hue determiner 16, a hue histogram generator 17, and a gamut information output unit 18. The first color data R1, G1, B1 are input to the brightness calculator 14, saturation calculator 15, and hue determiner 16.

The brightness calculator 14 calculates brightness information VA from the first color data R1, G1, B1 for each pixel. The brightness information VA may be obtained by, for example, calculating the maximum value of the first color data or by multiplying the first color data values by respective coefficients and adding the resulting products. Given that the first color data values R1, G1, B1 representing 100% white are all 1.0 (R1=G1=B1=1.0), if the first color data conform to the RGB standard, their values never exceed 1.0, but if the first color data conform to the xvYCC standard, their values may sometimes exceed 1.0. In this case, the brightness information VA may exceed 1.0.

The saturation calculator 15 calculates and outputs saturation information SA from the first color data R1, G1, B1 for each pixel. The saturation information may be obtained by, for example, calculating the difference between the maximum and minimum values of the first color data or by dividing the difference by the maximum value. This embodiment uses the latter method. When the first color data conform to the sRGB standard, the value of the saturation information SA does not exceed 1.0, but when the first color data conform to the xvYCC standard, SA may exceed 1.0. More specifically, when the minimum value of the first color data falls below 0%, the difference between the maximum and the minimum values becomes larger than the maximum value, and accordingly the saturation information SA exceeds 1.0.

Figure 6:
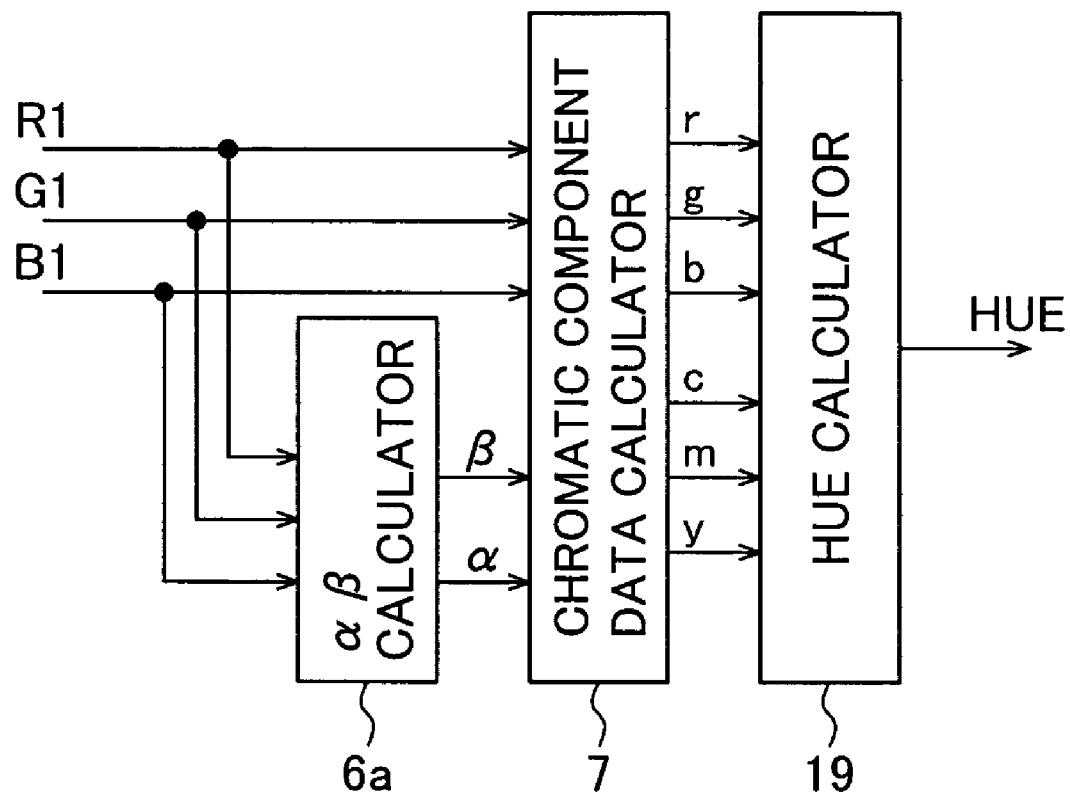
FIG. 6 is a block diagram showing an exemplary internal structure of the hue determiner.
Figure 7A:
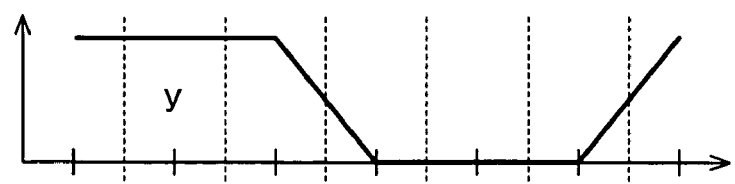
FIGS. 7A, 7B, 7C, 7D, 7E, and 7F show exemplary relationships between hues, chromatic component data, and hue information.
Figure 7B:
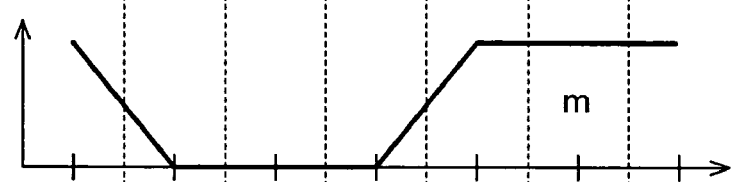
Figure 7C:
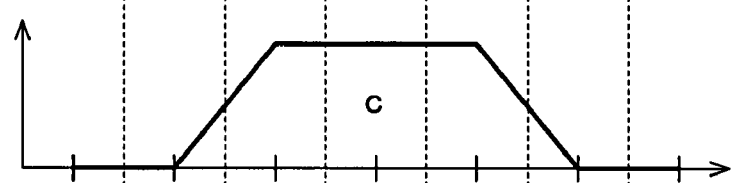
Figure 7D:
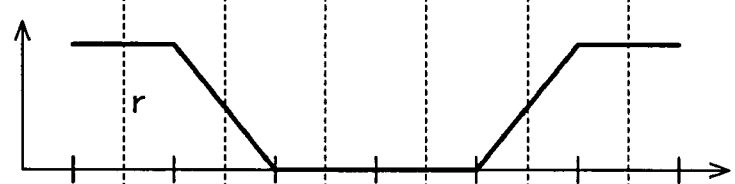
Figure 7E:
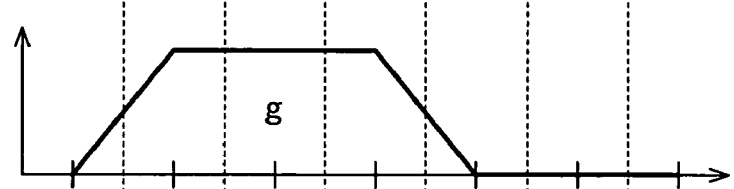
Figure 7F:
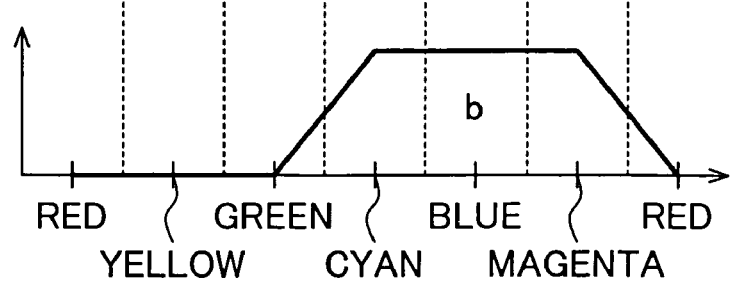

The hue determiner 16 calculates and outputs hue information (denoted HUE in the drawings) from the first color data R1, G1, B1 for each pixel. Seven hue information values may be output, for example, corresponding to the six hues red, yellow, green, cyan, blue, and magenta and the achromatic component. Referring to FIG. 6, the hue determiner 16 comprises the αβ calculator 6a, the chromatic component data calculator 7, and a hue calculator 19.

The αβ calculator 6a selects and outputs the maximum value β and minimum value α of the first color data R1, G1, B1. The output maximum value β and minimum value α are input to the chromatic component data calculator 7.

Figures 8, 9:
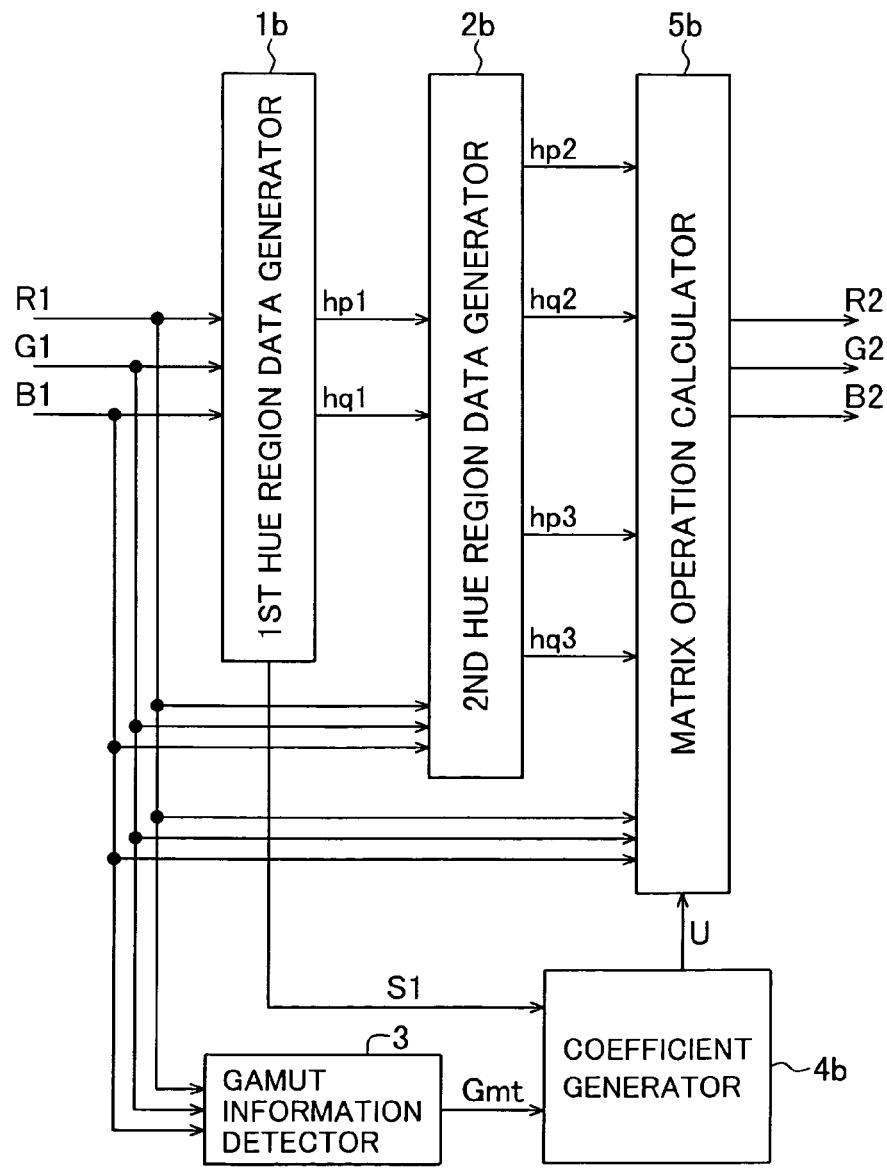
FIG. 8 is a table showing exemplary hue decision conditions.
FIG. 9 is a block diagram illustrating a color conversion apparatus according to a second embodiment of the invention.

The hue determiner 16 receives the first color data R1, G1, B1 and the maximum value β and the minimum value α output from the αβ calculator 6a, and outputs six items of chromatic component data r, g, b, y, m, and c. The hue calculator 19 uses the magnitude relationship among the six items of chromatic component data r, g, b, y, m, and c to obtain the hue information (HUE). When y is greater than b and m is greater than g (y>b, m>g), the hue calculator 19 identifies the hue as red and outputs a hue information value of zero (HUE=0). FIGS. 7A to 7F show the six hues red, yellow, green, cyan, blue, magenta, the chromatic component data r, b, g, y, m, c, and the hue information. FIG. 8 shows exemplary hue decision conditions for the six hues represented by the chromatic component data. When the chromatic component data are all zero, the hue calculator 19 identifies the color as achromatic and outputs a hue information value of six (HUE=6).

The brightness information VA, saturation information SA, and hue information HUE calculated for each pixel are input to the hue histogram generator 17. The hue histogram generator 17 cumulatively adds brightness information VA and saturation information SA of each hue over a predetermined period such as several frame intervals, for example, and generates histograms H(H, S, V) for each hue. For example, H(0, S, V) indicates a histogram of saturation information SA and a histogram of brightness information VA for the hue red in the preceding several frames. The gamut information output unit 18 calculates the gamut information Gmt with reference to the histograms H(H, S, V) of each hue. In this process, the hue histogram generator 17 calculates the maximum values or values equivalent to the maximum values of the saturation information SA and brightness information VA of the first color data input during the predetermined period. The period may be as short as one frame interval. When the period is short, fewer data have to be collected to generate the histogram, but there is the disadvantage of susceptibility to noise.

The gamut information Gmt may be output as, for example, the maximum value or a value equivalent to the maximum values of the saturation information SA, and the maximum value or a value equivalent to the maximum value of the brightness information VA. When each data value constituting one class in the histogram, a value equivalent to the maximum value is the first data value at which the cumulative frequency (cumulative count) exceeds a predefined threshold when the frequency data are counted in descending order in the histogram. When one class in the histogram comprises a plurality of data values, the representative value (for example, the median value) of the first class at which the frequency exceeds the predefined threshold is the value equivalent to the maximum value.

When the maximum values of the saturation information SA and brightness information VA are used as hue histogram information Gmt, a maximum value calculator can be used in place of the hue histogram generator 17. This simplifies the structure of the gamut information detector, but use of the maximum values of the saturation information SA and brightness information VA makes the gamut information detector more susceptible to noise.

The gamut information Gmt in the following description is generated as described above.

The gamut information Gmt is input to the coefficient generator 4a. By referring to the gamut information Gmt, the coefficient generator 4a generates a set of matrix coefficients U used by the matrix operation calculator 5a. The matrix coefficients U comprise a coefficient matrix (A2$ij$) related to the second hue region data and a coefficient matrix (A3$ij$) related to the third hue region data. (The letters i and j denote rows and columns in the matrix.) The matrix operation calculator 5a calculates the second color data R2, G2, B2 according to the matrix equation (4) below. In this operation, the second color data R2, G2, B2 are clipped to the range from 0% to 100%. The matrix coefficients (A2$ij$) related to the second hue region data and the matrix coefficients (A3$ij$) related to the third hue region data both represent matrices with three rows (i=1 to 3) and six columns (j=1 to 6).

$$\begin{bmatrix} R2 \\ G2 \\ B2 \end{bmatrix} = \begin{bmatrix} R1 \\ G1 \\ B1 \end{bmatrix} + (A2ij) \begin{bmatrix} hr2 \\ hg2 \\ hb2 \\ hc2 \\ hm2 \\ hy2 \end{bmatrix} + (A3ij) \begin{bmatrix} hr3 \\ hg3 \\ hb3 \\ hc3 \\ hm3 \\ hy3 \end{bmatrix} \quad (4)$$

The coefficient generator 4a generates the matrix coefficients (A2$ij$ and A3$ij$) on the basis of the gamut information Gmt. The gamut information Gmt includes the maximum values of the saturation information SA and brightness information VA of the six hues red, yellow, green, cyan, blue, and magenta, or values equivalent to the maximum values. Saturation information is closely linked to the magnitude of the complementary color components of each hue. Brightness information is closely linked to the magnitude of the primary color components of each hue. For example, since the complementary color of red is cyan, the complementary color components of the red hue are the G and B data constituting cyan. The primary color component of the red hue is R data. The coefficient generator 4a refers to the saturation information of each hue included in the gamut information Gmt in generating the coefficients related to the complementary color components of the hue. For example, the coefficient generator 4a refers to the saturation information of the red hue in generating the coefficients that determines the magnitude of the G data and B data for the red hue (in equation (4), the coefficients related to hr2 or hr3 are used in the calculation of G2 and B2). In generating the coefficients related to the primary color components of a hue, the coefficient generator 4a refers to the brightness information of each hue included in the gamut information Gmt. For example, the coefficient generator 4a refers to the brightness information of red to generate the coefficients that determine the magnitude of the R data for the red hue (in equation (4), the coefficients related to hr2 or hr3 are related to the calculation of R2).

The first color data may include various types of color data such as color data conforming to the sRGB standard and color data conforming to the xvYCC standard, and may take values that fall below 0% and exceed 100%, as described above, where 0% is the RGB data value representing black and the 100% is the RGB data value representing white. Allowing values below 0% and above 100% makes it possible to represent a wider range of colors. Allowing values below 0% makes it possible to represent colors with higher saturation; allowing values exceeding 100% makes it possible to represent colors with higher brightness.

The second color data, however, are adapted to the properties of the image display device that will display the data, and their values range from 0% to 100%. 0% is the data value representing black: ideally, the data value for which the image display device emits no light. 100% is the data value for which the image display device emits the maximum amount of light. When the data values of R, G, B are 100%, the displayed color is the white color of the image display device. To convert the first color data to the second color data, the color conversion apparatus must map first color data having a value less than 0% or exceeding 100% to second color data in the range from 0% to 100%. If the second color data were to have a value below 0% or above 100%, the color would be outside the gamut that could be displayed by the image display device, and the result would be color collapse.

Particularly when the first color data include a substantial number of values less than 0% or exceeding 100%, the coefficient generator 4a generates coefficients so as to convert the first color data to the second color data without color collapse. Suppose that the first color data include, for example, pixels with R1=80%, G1=0% and B1=−20%. In this case, the maximum value of the first color data is 80% and minimum value is −20%. The saturation information exceeds 1.0: SA=(80%−(−20%))/80%=1.25. The hue represented by these data is determined to be red, so the maximum saturation value of red in the image exceeds 1.0. When the maximum saturation value of one of the hues exceeds 1.0, the coefficient generator 4a increases the coefficients related to the complementary color components of that hue, because of the inferred presence of first color data values less than 0%.

Suppose now that the first color data include pixels with values exceeding 100%: for example, R1=120%, G1=20% and B1=0%. In this case, the maximum value of the first color data is 120%. The brightness information VA is 120%, exceeding 100%. The hue of these pixels is determined to be red, so the maximum brightness value of red in the image exceeds 100%. When the maximum brightness value of one of the hues exceeds 100%, the coefficient generator 4a decreases the coefficients of the primary color components of the hue because of the inferred presence of first color data values exceeding 100%.

If the second hue data are valid when the saturation and brightness are both low and the third gamut data are valid when the saturation or brightness is high, the coefficients (A2$ij$) are valid when the saturation and brightness are low while the coefficients (A3$ij$) are valid when the saturation or brightness is high. The coefficient generator 4a could then be configured to alter only coefficients (A3$ij$) according to the gamut information Gmt. If this is done, then when the first color data include values less than 0%, yielding high saturation, color collapse can be avoided by decreasing the saturation, not for all colors (the entire image) but only for colors having high saturation, thereby avoiding making the image as a whole appear pale or washed out. Similarly, when there are first color data exceeding 100%, indicating high brightness, the brightness need not be decreased for all colors but only for the colors having high brightness, thereby avoiding color collapse without darkening the entire image. In this case, coefficients (A2$ij$) can be set in advance according to the properties of the image display device.

The coefficient generator 4$a$ is not limited to operating as described above. As another exemplary mode of operation, the coefficient generator 4$a$ may be adapted to generate coefficients with values predetermined according to the properties of the image display device whenever the gamut information Gmt indicates that the first color data have a narrow gamut of colors, or coefficients that vary in a predetermined way depending on the gamut information Gmt whenever the gamut information Gmt indicates that the first color data have a narrow gamut of colors. For example, when the coefficient generator 4$a$ determines from the gamut information Gmt that the saturation of a particular hue in the first color data is low, it can generate coefficients to decrease the complementary color component(s) of that hue, and when the coefficient generator 4$a$ determines from the gamut information Gmt that the brightness of a particular hue in the first color data is low, it can generate coefficients to increase the primary color component(s) of that hue. A pale or dark image can thereby be converted to a more vivid image.

The first embodiment is not limited to having the gamut information detector 3 detect gamuts for six hues (red, yellow, green, cyan, blue, and magenta) and the first hue region data generator 1$a$ calculate data valid for these six hues. The number of hues may be greater than or less than six. Reducing the number of hues simplifies the apparatus, while increasing the number of hues gives the apparatus more subtle control over color rendition. The calculation of matrix coefficients is easiest, however, when the hues for which gamuts are detected are also hues for which the hue region data are valid.

As described above, in the first embodiment, even if the color conversion apparatus receives color data with various unknown gamuts of colors, it can operate with color conversion characteristics appropriate for the gamut of the input color data because the matrix coefficients used in the color conversion process are generated on the basis of the gamut information detected by the gamut information detector. In particular, the color conversion apparatus can reduce the occurrence of color collapse by performing appropriate color conversion for color data having wide gamuts.

Second Embodiment

The color conversion apparatus of the second embodiment reduces the amount of calculation by using the property that at least two of the chromatic component data values, including one of the r, g, b values and one of the y, m, c values, are zero. Referring to FIG. 9, the color data conversion apparatus in the second embodiment comprises a first hue region data generator 1$b$, a second hue region data generator 2$b$, a gamut information detector 3, a coefficient generator 4$b$, and a matrix operation calculator 5$b$. The gamut information detector 3 is the same as in the first embodiment. In the drawing, the first color data R1, G1, B1 are input to the first hue region data generator 1$b$, second hue region data generator 2$b$, and gamut information detector 3.

Figure 10:
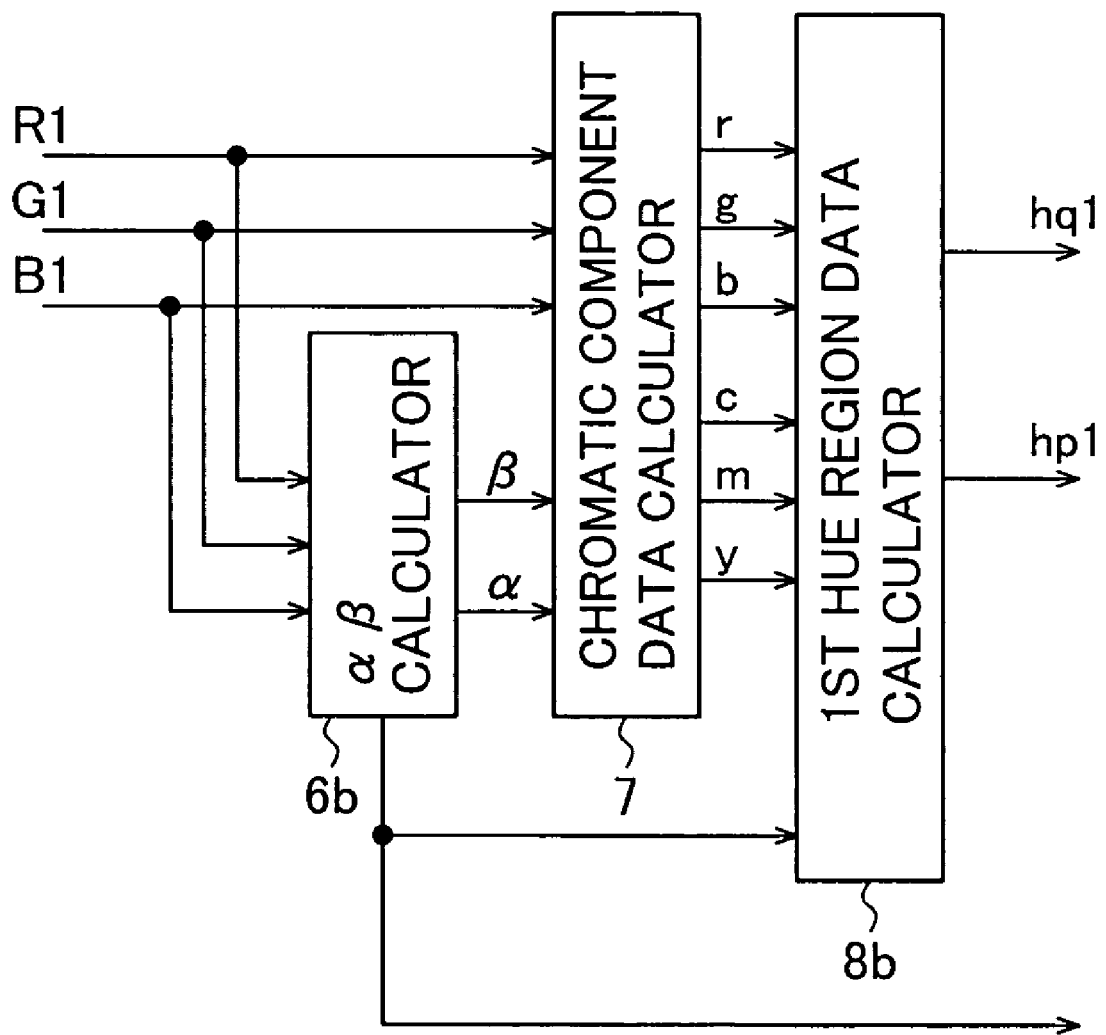
FIG. 10 is a block diagram showing an exemplary internal structure of the first hue region data calculator in the second embodiment.

Referring to FIG. 10, in the first hue region data generator 1$b$, the first color data R1, G1, and B1 are input to an $\alpha\beta$ calculator 6$b$ and a chromatic component data calculator 7. The $\alpha\beta$ calculator 6$b$ selects and outputs the maximum value $\beta$ and minimum value $\alpha$ of the first color data R1, G1, B1, and generates an identification code S1 indicating the colors in which the maximum and minimum values occur. The output maximum value $\beta$ and minimum value $\alpha$ are input to the chromatic component data calculator 7. The identification code S1 is input to a first hue region data calculator 8$b$ and is also externally output. The chromatic component data calculator 7 receives the first color data R1, G1, B1 and the maximum value $\beta$ and minimum value $\alpha$, performs subtraction (r=R1−$\alpha$, g=G1−$\alpha$, b=B1−$\alpha$, y=$\beta$−B1, m=$\beta$−G1, c=$\beta$−R1), and outputs the six items of chromatic component data r, g, b, y, m, and c.

As in the first embodiment, the chromatic component data have the property that at least one of the r, g, and b values and at least one of the y, m, and c values are zero. The chromatic component data are input to the first hue region data calculator 8$b$. Based on the information of the identification code S1, the first hue region data calculator 8$b$ selects two items of non-zero data Q1, Q2 from chromatic component data r, g, b and two items of non-zero data P1, P2 from chromatic component data y, m, c. When two or more items of chromatic component data r, g, b are zero, however, at least one of Q1 and Q2 is zero; when two or more items of chromatic component data y, m, c are zero, at least one of P1 and P2 is zero. The first hue region data calculator 8$b$ calculates the first hue region data hq1, hp1 according to the equations (5) below. The operation min(A, B) gives the minimum value of A and B.

$$hq1=\min(Q1,Q2)$$

$$hp1=\min(P1,P2) \quad (5)$$

In these equations, the value of first hue region data hq1 is one of hy1=min(r, g), hm1=min(b, r), and hc1=min(g, b), and the value of first hue region data hp1 is one of hr1=min(y, m), hg1=min(c, y), and hb1=min(m, c). The values of hq1 and hp1 are determined for each pixel and can be distinguished by the value of the identification code S1 at each pixel. The first hue region data hq1 and hp1 are input to the second hue region data generator 2$b$.

Figure 11:
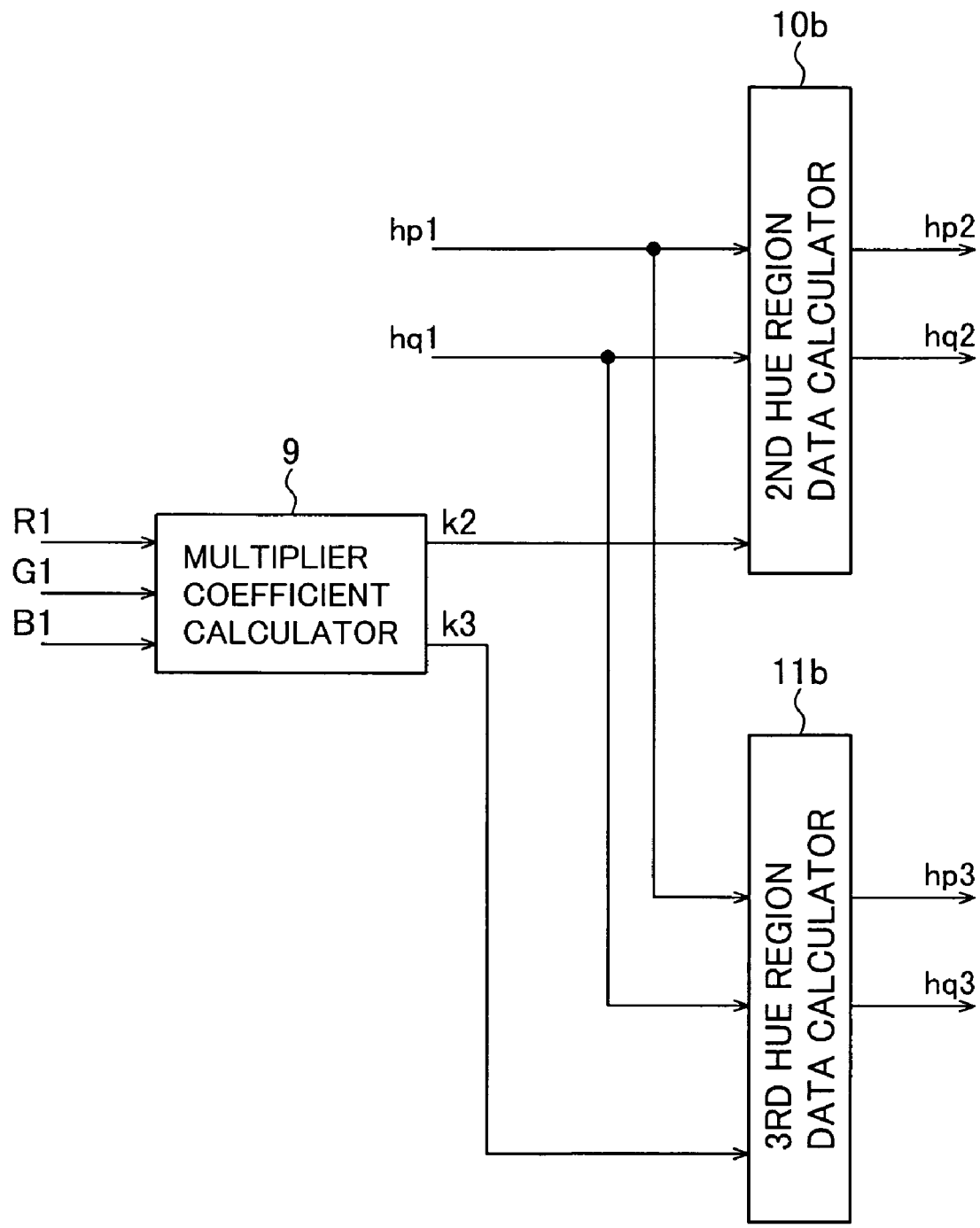
FIG. 11 is a block diagram showing an exemplary internal structure of the second hue region data calculator in the second embodiment.

The first color data R1, G1, B1 are input to the multiplier coefficient calculator 9 in FIG. 11. The multiplier coefficient calculator 9 calculates a multiplier coefficient k2 for calculating the second hue region data and a multiplier coefficient k3 for calculating the third hue region data with reference to the input first color data R1, G1, B1. The multiplier coefficient calculator 9 may have the same configuration as in the first embodiment. The second hue region data calculator 10$b$ calculates the second hue region data hp2 and hq2 according to equation (6) below.

$$hp2=k2\times hp1$$

$$hq2=k2\times hq1 \quad (6)$$

The third hue region data calculator 11$b$ calculates the third hue region data hp3 and hq3 according to equation (7) below.

$$hp3=k3\times hp1$$

$$hq3=k3\times hq1 \quad (7)$$

The second hue region data hq2, hp2 output from the second hue region data calculator 10$b$ and the third hue region data hq3, hp3 output from the third hue region data calculator 11$b$ are input to the matrix operation calculator 5$b$.

Operating as described in the first embodiment, the gamut information detector 3 receives the first color data R1, G1, B1, estimates the gamut of colors in the image data formed by the first color data, and outputs gamut information data Gmt.

The gamut information Gmt is input to the coefficient generator 4$b$. The coefficient generator 4$b$ generates the matrix coefficients U used in the matrix operation calculator 5*b* on a pixel-by-pixel basis with reference to the gamut information Gmt and the identification code S1. The matrix coefficients U comprise matrix coefficients (A2*ij*) related to the second hue region data and matrix coefficients (A3*ij*) related to the third hue region data. (The letters i and j denote rows and columns in the matrix.) The matrix operation calculator 5*a* calculates the second color data R2, G2, B2 according to the matrix operation expressed in equation (8) below. The matrix coefficients (A2*ij*) related to the second hue region data and the matrix coefficients (A3*ij*) related to the third hue region data both represent matrices with three rows (i=1 to 3) and six columns (j=1 to 2).

$$\begin{bmatrix} R2 \\ G2 \\ B2 \end{bmatrix} = \begin{bmatrix} R1 \\ G1 \\ B1 \end{bmatrix} + (A2ij)\begin{bmatrix} hp2 \\ hq2 \end{bmatrix} + (A3ij)\begin{bmatrix} hp3 \\ hq3 \end{bmatrix} \qquad (8)$$

In the second embodiment, as in the first embodiment, even if the color conversion apparatus receives color data with various unknown gamuts of colors, it can operate with color conversion characteristics appropriate for the gamut of the input color data because the matrix coefficients used in the color conversion process are generated on the basis of the gamut information detected by the gamut information detector. The color conversion apparatus can accordingly reduce the occurrence of color collapse by performing appropriate color conversion for color data having wide gamuts. In addition, because the color conversion apparatus in the second embodiment takes advantage of the properties of the chromatic component data and performs only the necessary computations for each pixel, the amount of computation (and hence the circuit size) can be reduced.

Third Embodiment

The third embodiment modifies the gamut information detector 3 used in the first and second embodiments.

Figure 12:
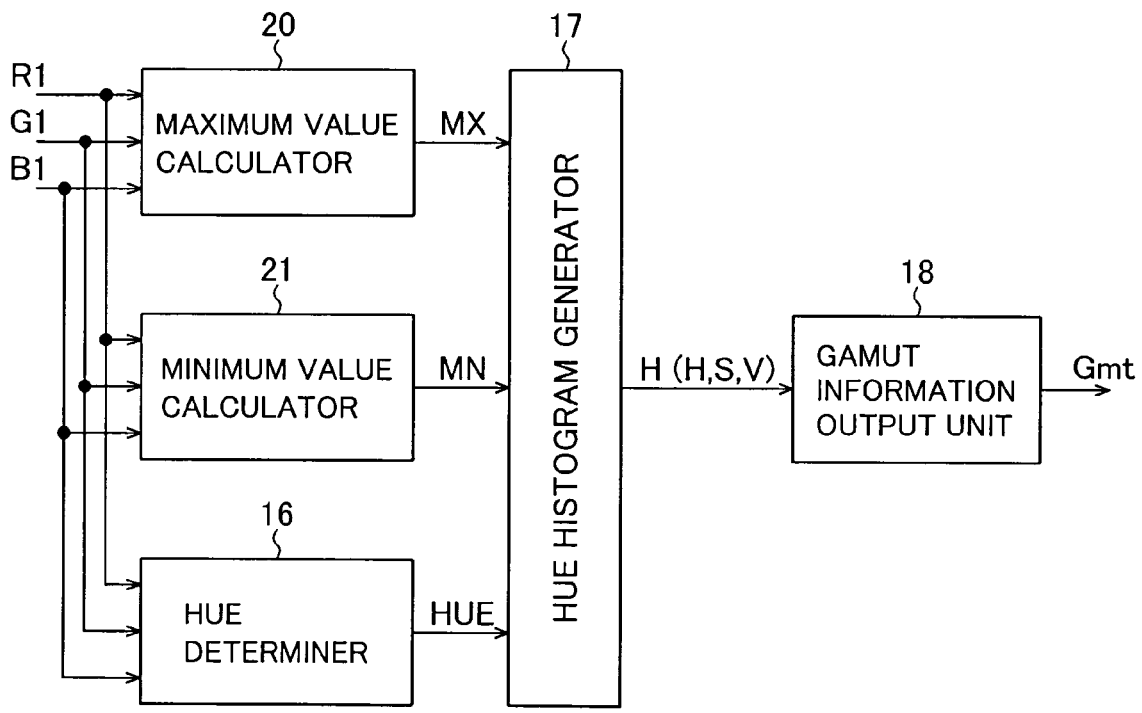
FIG. 12 is a block diagram showing an exemplary internal structure of the gamut information detector in a third embodiment.

FIG. 12 is a block diagram showing an exemplary internal structure of the gamut information detector in the third embodiment. The gamut information detector 3 shown in FIG. 12 comprises a maximum value calculator 20 and a minimum value calculator 21 instead of the brightness calculator 14 and saturation calculator 15 in the gamut information detector 3 in the first embodiment. The maximum value calculator 20 calculates and outputs the maximum value MX among the first color data R1, G1 and B1 (same as the maximum value β above) for each pixel. The minimum value calculator 21 calculates and outputs the minimum value MN among the first color data R1, G1 and B1 (same as the minimum value α above) for each pixel. The hue histogram generator 17 uses the maximum value MX as brightness information VA and the complement of the minimum value MN as saturation information SA, and carries out operations similar to those explained in the first embodiment above.

The gamut information output unit 18 operates as explained in the first embodiment. The output gamut information Gmt includes a maximum value or a value equivalent to the maximum value of the maximum values MX for each hue over a certain period, equal to several frame intervals, for example (therefore, a maximum value or value equivalent to the maximum value among a predetermined number of first color data values), and a maximum value or a value equivalent to the maximum value of the complements of the minimum values MN over a certain period, equal to several frame intervals, for example, in other words, the complement of the minimum value or a value equivalent to the minimum value among a predetermined number of first color data values. As in the first embodiment, the coefficient generator 4*a*, generates coefficients related to the complementary color components of a hue with reference to the saturation information of each hue included in the gamut information Gmt, and generates coefficients related to the primary color components of the hue with reference to the brightness information of each hue included in the gamut information Gmt. In other words, the coefficient generator 4*a* refers to the minimum value of the first color data for each hue to generate coefficients related to the complementary color component of the hue, and refers to the maximum value of the first color data to generate coefficients related to the primary color components of the hue.

The minimum value of the color data of a given hue depends strongly on the magnitude of the complementary color components of the hue. That is why, the coefficient generator 4*a* refers to the minimum value of the first color data of each hue included in the gamut information Gmt when generating coefficients related to the complementary color components of the hue. For example, the minimum color data of red is the G data or B data. The complementary color of red is cyan, which is generated by G and B data, thus, the complementary color components of red relate to the G and B data. Therefore, when the minimum value of red is less than 0%, the coefficients to be generated for the G data and B data, which are related to the complementary color component, can be increased to avoid color collapse in the second color data.

The coefficient generator 4*a* generates coefficients related to the primary color component of the hue with reference to the maximum value of the first color data of each hue included in the gamut information Gmt. For example, the maximum color data of red is the R data. The primary color component of the red relates to the R data. Therefore, when the maximum value of red exceeds 100%, the coefficients to be generated for the R data, which are related to the primary color component, can be decreased to avoid color collapse in the second color data.

The gamut information detector 3 according to the third embodiment can have a simplified structure because it uses signal quantities such as the maximum and minimum value of the color signal as gamut information and does not use saturation information, which requires more calculation. Since the matrix coefficients used for the matrix operation represent ratios to the color data, however, and since saturation calculations give a ratio to the magnitude of the color data, the saturation information is more suitable for determining the matrix coefficients. The configuration of the gamut information detector should be selected according to the intended application.

A few variations of the preceding embodiments have been mentioned above, but those skilled in the art will recognize that further variations are possible within the scope of the invention, which is defined in the appended claims.

What is claimed is:

1. A color conversion apparatus for converting first image data to second image data, the first and second image data both describing an image with a plurality of picture elements (pixels), the first image data including first color data with three values per pixel, the three values expressing, respectively, red, green, and blue color components of the pixel, the three values having ranges extending beyond a range from 0% to 100% in each of the red, green, and blue color components, the second image data including second color data with three values per pixel expressing, respectively, the red, green, and blue color components of the pixel, the color conversion apparatus comprising:
- a characteristic information calculator for calculating characteristic information of the first color data, the characteristic information including brightness or saturation;
- a first hue region data generator for calculating, from the first color data, a plurality of first hue region data values valid in respective hue regions surrounding certain predetermined hues;
- a second hue region data generator for using the characteristic information to adjust magnitudes of the plurality of the first hue region data values to obtain second hue region data values and third hue region data values;
- a gamut information detector for detecting a gamut of colors of the first image data and outputting gamut information representing the detected gamut of colors;
- a coefficient generator for generating matrix coefficients for the second and third hue region data values with reference to the gamut information; and
- a matrix operation calculator for deriving the second color data by performing a matrix operation including multiplication of the second and third hue region data values by the matrix coefficients.

2. The color conversion apparatus of claim 1, wherein the gamut information detector detects the gamut information for each of the predetermined hues.

3. The color conversion apparatus of claim 1, wherein:
the gamut information detector calculates maximum values, or values equivalent thereto, of the predetermined hues in a certain number of the first color data as at least part of the gamut information; and
the coefficient generator uses the maximum values or the values equivalent thereto to generate matrix coefficients for adjusting magnitudes of the second and third color region data representing primary color components of hues for which the maximum values or the values corresponding to the maximum values were calculated.

4. The color conversion apparatus of claim 3, wherein:
one of the second hue region data and the third hue region data has values that increase with increasing brightness of the first color data; and
the coefficient generator causes the matrix coefficients for multiplying the hue region data that increase with increasing brightness to vary according to the gamut information.

5. The color conversion apparatus of claim 1, wherein:
the gamut information detector calculates minimum values, or values equivalent thereto, of the predetermined hues in a certain number of the first color data as at least part of the gamut information; and
the coefficient generator uses the minimum values or the values equivalent thereto to generate matrix coefficients for adjusting magnitudes of the second and third hue region data representing complementary color components of hues for which the maximum values or the values corresponding to the maximum values were calculated.

6. The color conversion apparatus of claim 5, wherein:
one of the second hue region data and the third hue region data has values that increase with increasing saturation of the first color data; and
the coefficient generator causes the matrix coefficients for multiplying the hue region data that increase with increasing saturation to vary according to the gamut information.

7. The color conversion apparatus of claim 1, wherein:
the gamut information detector calculates maximum brightness values, or values equivalent thereto, of the predetermined hues in a certain number of the first color data as at least part of the gamut information; and
the coefficient generator uses the maximum brightness values or the values equivalent thereto to generate matrix coefficients for adjusting magnitudes of the second and third color region data representing primary color components of hues for which the maximum brightness values or the values corresponding to the maximum values were calculated.

8. The color conversion apparatus of claim 7, wherein:
one of the second hue region data and the third hue region data has values that increase with increasing brightness of the first color data; and
the coefficient generator causes the matrix coefficients for multiplying the hue region data that increase with increasing brightness to vary according to the gamut information.

9. The color conversion apparatus of claim 1, wherein:
the gamut information detector calculates maximum saturation values, or values equivalent thereto, of the predetermined hues in a certain number of the first color data as at least part of the gamut information; and
the coefficient generator uses the maximum saturation values or the values equivalent thereto to generate matrix coefficients for adjusting magnitudes of the second and third hue region data representing complementary color components of hues for which the maximum saturation values or the values corresponding to the maximum values were calculated.

10. The color conversion apparatus of claim 9, wherein:
one of the second hue region data and the third hue region data has values that increase with increasing saturation of the first color data; and
the coefficient generator causes the matrix coefficients for multiplying the hue region data that increase with increasing saturation to vary according to the gamut information.

11. A method of converting first image data to second image data, the first and second image data both describing an image with a plurality of pixels, the first image data including first color data with three values per pixel, the three values expressing, respectively, red, green, and blue color components of the pixel, the three values having ranges extending beyond a range from 0% to 100% in each of the red, green, and blue color components, the second image data including second color data with three values per pixel expressing, respectively, the red, green, and blue color components of the pixel, the method comprising:
- calculating characteristic information of the first color data, the characteristic information including brightness or saturation;
- calculating, from the first color data, a plurality of first hue region data values valid in respective hue regions surrounding certain predetermined hues;
- using the characteristic information to adjust magnitudes of the plurality of the first hue region data values to obtain second hue region data values and third hue region data values;
- detecting a gamut of colors of the first image data and outputting gamut information representing the detected gamut of colors;
- generating matrix coefficients for the second and third hue region data values with reference to the gamut information; and
- deriving the second color data by performing a matrix operation including multiplication of the second and third hue region data values by the matrix coefficients.

* * * * *